(12) United States Patent
Qian et al.

(10) Patent No.: US 9,460,359 B1
(45) Date of Patent: Oct. 4, 2016

(54) PREDICTING A TARGET LOGOGRAM

(71) Applicant: LENOVO (Singapore) PTE, LTD., New Tech Park (SG)

(72) Inventors: Ming Qian, Cary, NC (US); Jian Li, Chapel Hill, NC (US); Song Wang, Cary, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 20 days.

(21) Appl. No.: 14/656,436

(22) Filed: Mar. 12, 2015

(51) Int. Cl.
G06K 9/22 (2006.01)
G06F 3/041 (2006.01)
G06F 3/0354 (2013.01)

(52) U.S. Cl.
CPC ........... G06K 9/222 (2013.01); G06F 3/03545 (2013.01); G06F 3/041 (2013.01)

(58) Field of Classification Search
CPC ............... G06K 9/222; G06K 9/2054; G06K 3/03545; G06K 3/041; G06K 3/17; G06K 3/04833
USPC ........................................................ 345/173
See application file for complete search history.

(56) References Cited

U.S. PATENT DOCUMENTS

| | | | | |
|---|---|---|---|---|
| 9,064,169 B2* | 6/2015 | Suzuki | ................... | G06F 3/041 |
| 9,195,326 B2* | 11/2015 | Sugimura | ............... | G06F 3/041 |
| 2003/0123745 A1* | 7/2003 | Bryborn | ................... | G06F 3/017 382/242 |
| 2004/0126017 A1* | 7/2004 | Seni | ...................... | G06K 9/2054 382/229 |
| 2010/0270671 A1* | 10/2010 | Holesovsky | ........ | G06F 17/5068 257/734 |
| 2013/0011065 A1* | 1/2013 | Yoshida | ................ | G06F 3/0317 382/187 |
| 2014/0015776 A1* | 1/2014 | Kim | ..................... | G06F 3/03545 345/173 |
| 2014/0132533 A1* | 5/2014 | Inaba | .................. | G06F 3/03545 345/173 |
| 2014/0204126 A1* | 7/2014 | Mankowski | ........ | G06F 3/03545 345/646 |
| 2015/0077358 A1* | 3/2015 | Wang | ..................... | G06K 9/222 345/173 |
| 2015/0153850 A1* | 6/2015 | Fujii | ................... | G06F 3/03545 345/173 |
| 2016/0048318 A1* | 2/2016 | Markiewicz | ........ | G06F 3/04883 345/173 |

* cited by examiner

*Primary Examiner* — Fred Tzeng

(74) *Attorney, Agent, or Firm* — Kunzler Law Group

(57) ABSTRACT

For predicting a target logogram, code generates a logogram prediction from a contiguous written input. In addition, the code removes a connective stroke between two connective points in the contiguous written input. The code generates a sub-logogram prediction for a sub-logogram formed by removing the connective stroke. In addition the code predicts a target logogram for the contiguous written input based on both the logogram prediction and the sub-logogram prediction.

20 Claims, 10 Drawing Sheets

200

| Point Data 205 |
| Point Data 205 |
| Point Data 205 |
| Point Data 205 |
| Stroke Line Data 207 |
| Logogram Prediction 270 |
| Sub-Logogram Prediction 275 |
| Target Logogram 280 |

205 ↙

| Point Coordinates 210 |
| --- |
| X Axis Velocity 215 |
| Y Axis Velocity 220 |
| Stroke Pressure 225 |
| Stroke Width 230 |
| Stroke Differential 235 |
| Connective Score 240 |

FIG. 2B

PREDICTING A TARGET LOGOGRAM

BACKGROUND

1. Field

The subject matter disclosed herein relates to logograms and more particularly relates to predicting a target logogram.

2. Description of the Related Art

Logograms such as Chinese characters, Japanese characters, and/or Korean characters may be generated from a written input on a written input device.

BRIEF SUMMARY

An apparatus for predicting a target logogram is disclosed. The apparatus includes a written input device, a processor, and a memory. The memory may store code executable by the processor. The code may generate a logogram prediction from a contiguous written input from the written input device. In addition, the code may remove a connective stroke between two connective points in the contiguous written input. The code may generate a sub-logogram prediction for a sub-logogram formed by removing the connective stroke. In addition the code may predict a target logogram for the contiguous written input based on both the logogram prediction and the sub-logogram prediction. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a schematic block diagram illustrating one embodiment of point data;

DETAILED DESCRIPTION

Figure 1:
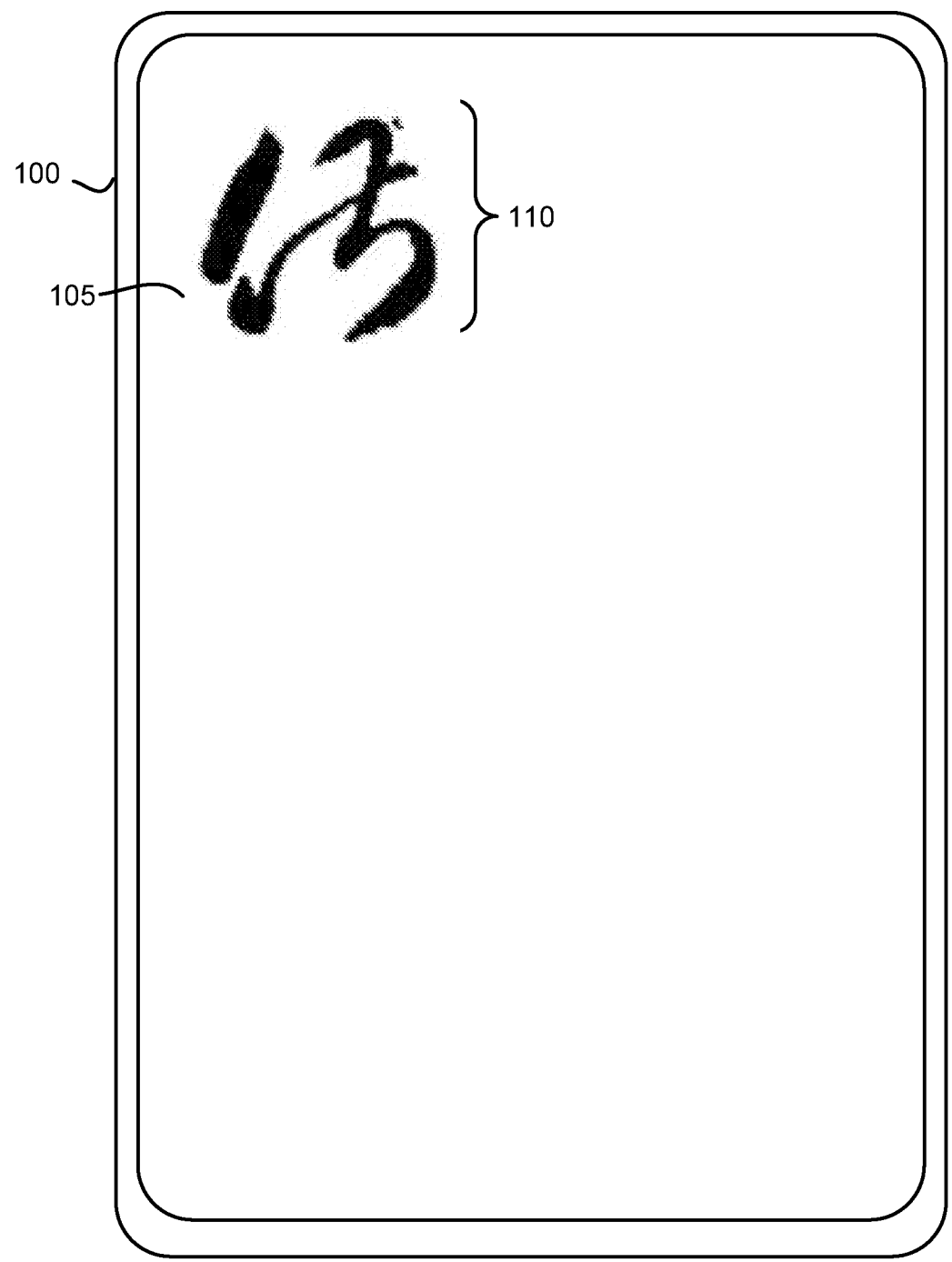
FIG. 1 is a front view drawing illustrating one embodiment of a written input device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a front view drawing illustrating one embodiment of a written input device 100. In the depicted embodiment, the written input device 100 is a tablet computer. Alternatively, the written input device 100 may be a mobile telephone, a laptop computer, a computer workstation, an input tablet, or the like. In the depicted embodiment, the written input device 100 includes a display 105. The display 105 may be a touch screen.

A user may enter written input 110 to the written input device 100. A user may employ an input object such as a finger or a stylus to enter the written input 110. The written input 110 may be entered in a cursive form. In the depicted embodiment, a logogram written input 110 is entered in cursive form. Alternatively, the written input may include one or more characters of an alphabet entered in cursive form.

The cursive written input 110 may have connective strokes that connect portions of a logogram, portions of an alphabetic character, and/or two alphabetic characters. The connective strokes may impede the recognition of the written input 110.

The embodiments described herein remove the connective stroke from the written input 110 and generate a sub-logogram prediction for a sub-logogram formed by removing the connective stroke. In addition, the embodiments generate a logogram prediction for the written input 110 and predict a target logogram for the written input 110 based on both the logogram prediction and the sub-logogram prediction. As a result, the prediction of the target logogram is improved.

Figure 2A:
FIG. 2A is a schematic block diagram illustrating one embodiment of written input data.

FIG. 2A is a schematic block diagram illustrating one embodiment of written input data 200. The written input data 200 maybe organized as a data structure in a memory. In the depicted embodiment, the written input data 200 includes a plurality of point data 205. Each instance of point data 205 may describe a point of the written input 110. In addition, the written input data 200 includes stroke line data 207. The stroke line data 207 that describe one or more stroke lines as will be described hereafter. The point data 205 may be generated from the stroke line data 207.

The written input data 200 further includes a logogram prediction 270, a sub-logogram prediction 275, and a target logogram 280. The logogram prediction 270 may predict the target logogram 280 from the written input 110. The sub-logogram prediction 275 may predict a sub-logogram formed by removing a connective stroke from the written input 110. The logogram prediction 270 and the sub-logogram prediction 275 may be used to predict the target logogram 280.

FIG. 2B is a schematic block diagram illustrating one embodiment of the point data 205. The point data 205 maybe organized as a data structure in the written input data 200. In the depicted embodiment, the point data 205 includes point coordinates 210, an X axis velocity 215, a Y axis velocity 220, a stroke pressure 225, a stroke width 230, a stroke differential 235, and the connective score 240.

The point coordinates 210 may specify location of the point on the written input device 100. The point coordinates 210 may specify an absolute location, a relative location, one or more pixel addresses, or combinations thereof.

In one embodiment, a stroke line is fitted to the written input 110. The points for the point data 205 may be specified at regular intervals along the stroke line. Thus although a stroke of the written input 110 may be many pixels wide, a point may be specified at a center of the stroke.

The X axis velocity 215 may record a velocity of the input object at the point coordinates 210 of the point relative to an X axis. The X axis may be a horizontal axis. Alternatively, the X axis may be arbitrarily defined. The Y axis velocity 220 may record a velocity of the input object at the point coordinates 210 relative to a Y axis. The Y axis may be a vertical axis. Alternatively, the Y axis may be arbitrarily defined.

The stroke pressure 225 may record a pressure of the input object on the written input device 100 at the point coordinates 210. The pressure may be measured by embedded strain gauges, by a deformation of the display 105, or the like.

The stroke width 230 may record a width of the contact of the input object on the written input device 100 at the point coordinates 210. In one embodiment, the stroke width 230 is measured along a width line perpendicular to the stroke line as will be described hereafter.

The stroke differential 235 may be calculated as the difference in the stroke pressure 225 between the current point and one or more other points on the written input 110. In one embodiment, stroke differential 235 is calculated as the difference between the stroke pressure 225 of the current point and an average stroke pressure 225 at the one or more other points. The other points may include points directly adjacent to the current point. In one embodiment, the adjacent points number in the range of 1 to 20. Alternatively, the other points may be selected before a change of direction of the stroke line that is greater than an orientation threshold. In one embodiment, the orientation threshold is in the range of 15 to 45 degrees. In a certain embodiment, the other points are selected before an end of the stroke line.

Alternatively, the stroke differential 235 may be calculated as the difference in the stroke width 230 between the current point and the one or more adjacent points on the written input 110. In one embodiment, the stroke differential 235 is calculated as the difference between the stroke width 230 of the current point and an average stroke width 230 at the one or more adjacent points.

The connective score 240 may record a score calculated for the point. The calculation of the connective score 240 is described hereafter.

Figure 2C:
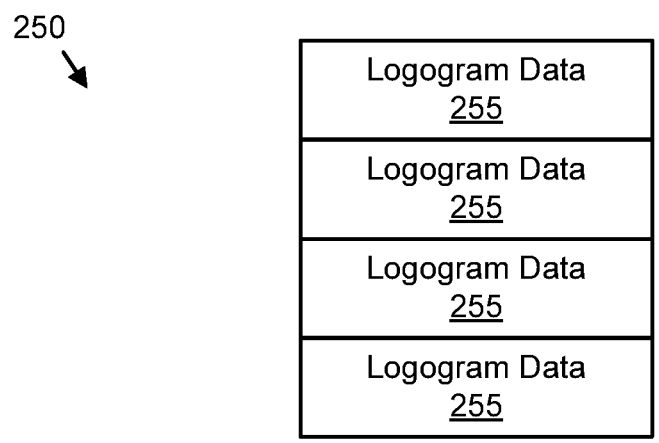
FIG. 2C is a schematic block diagram illustrating one embodiment of a logogram database.

FIG. 2C is a schematic block diagram illustrating one embodiment of a logogram database 250. The logogram database 250 maybe organized as a database in a memory. The logogram database 250 includes logogram data 255 for one or more logograms.

Figure 2D:
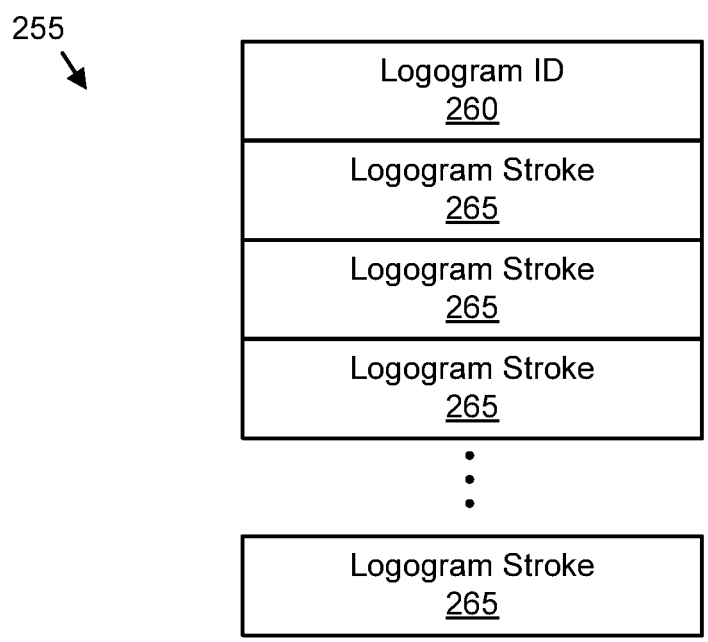
FIG. 2D is a schematic block diagram illustrating one embodiment of logogram data.

FIG. 2D is a schematic block diagram illustrating one embodiment of the logogram data 255. The logogram data 255 maybe organized as a data structure in the logogram database 250. In the depicted embodiment, the logogram data 255 includes a logogram identifier 260 and one or more logogram strokes 265.

The logogram identifier 260 may uniquely identify a logogram. The logogram may be a Chinese character, a Japanese character, a Korean character, or the like. In a certain embodiment, the logogram may be an alphabetic character. The logogram identifier 260 may be a Unicode representation or other binary representation of the logogram. The logogram stroke 265 may describe a written stroke used to form the logogram. The logogram stroke 265 may include an order of the logogram stroke 265 relative to other logogram strokes 265, orientations of one or more segments of the logogram stroke 265, relative lengths of the one or more segments of the logogram stroke 265, and the like. In one embodiment, the logogram strokes 265 are organized into one or more logogram elements. For example, the logogram strokes 265 for a logogram radical maybe organized as a logogram element.

Figure 3A:
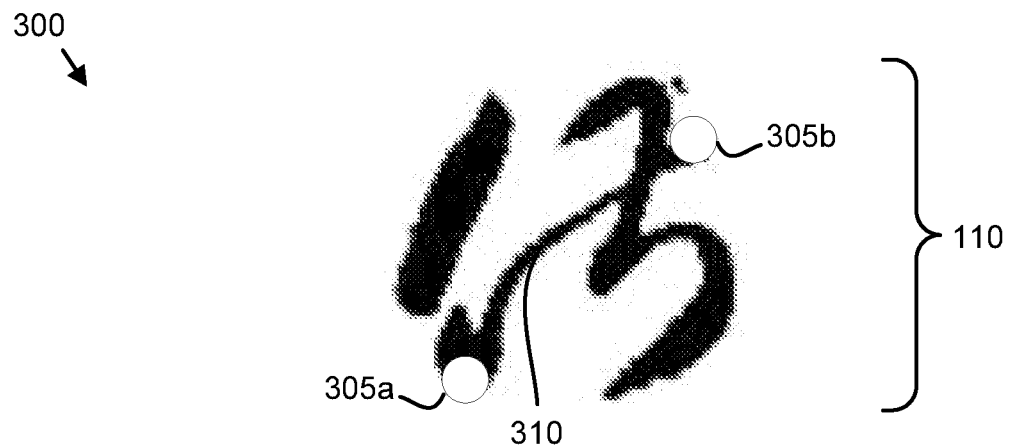
FIG. 3A is a drawing illustrating one embodiment of identifying connective points.

FIG. 3A is a drawing illustrating one embodiment of identifying connective points 305. A logogram written input 110 is shown. The logogram written input 110 includes one or more portions of contiguous written input 110. In addition, two connective points 305 are also shown. The connective points 305 may be identified in response to a connective score 240 for each connective point 305 exceeding a connective threshold as will be described hereafter.

A connective stroke 310 is also shown. The connective stroke 310 may be part of the contiguous written input 110. In addition, the connective stroke 310 may connect two logogram elements that are otherwise separate.

Figure 3B:
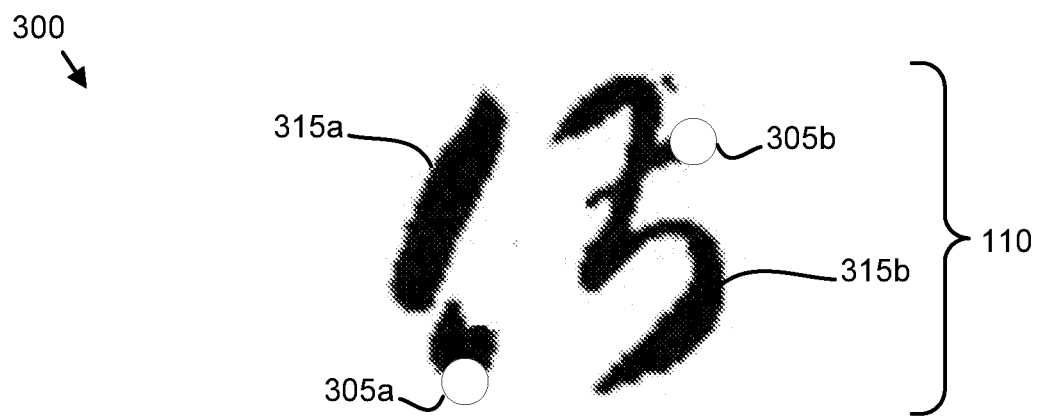
FIG. 3B is a drawing illustrating one embodiment of removing a connective stroke.

FIG. 3B is a drawing illustrating one embodiment of removing a connective stroke 310. The logogram written input 110 of FIG. 3A is shown with the connective stroke 310 removed. Removing the connected stroke 310 may form one or more sub-logograms. A sub-logogram may be a logogram element such as a logogram radical. Alternatively, the sub-logogram may be one or more strokes 320 of a logogram.

In one embodiment, removing the connective stroke 310 forms of first logogram element 315a from the contiguous written input 110 proceeding the first connective point 305a. In addition, removing the connective stroke 310 may form a second logogram element 315b from the contiguous written input 110 following the second connective point 305b.

Figure 3C:
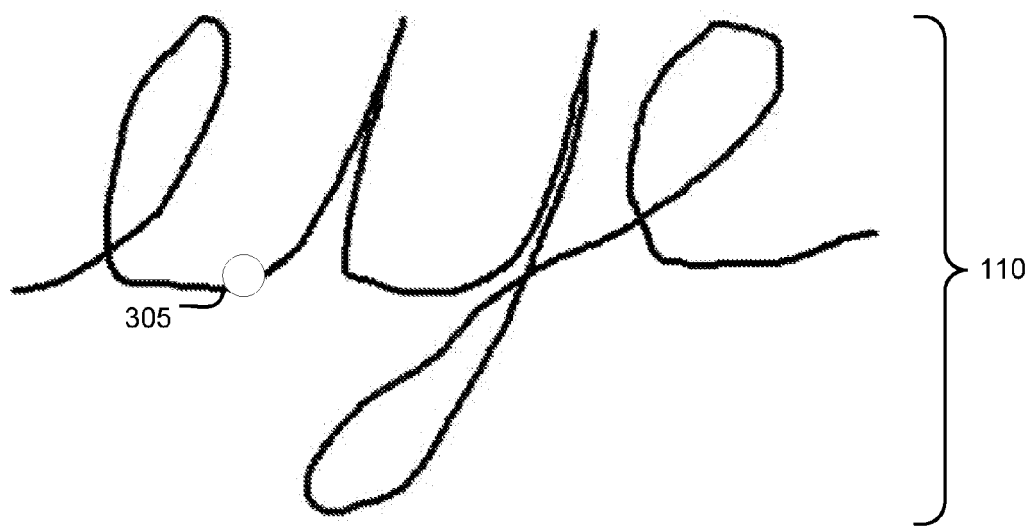
FIG. 3C is a drawing illustrating one embodiment of identifying a connective point.

FIG. 3C is a drawing illustrating one alternate embodiment of identifying a connective point 305. In the depicted embodiment, the written input 110 is a contiguous written input 110. The written input 110 is shown as a cursive form of the word "eye." In the depicted embodiment, a single connective point 305 is identified for the written input 110.

Figure 3D:
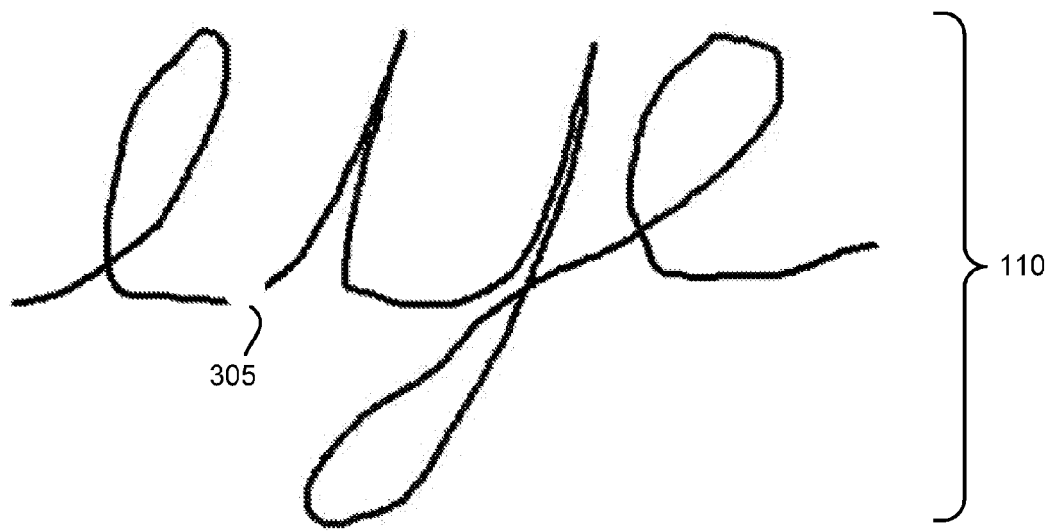
FIG. 3D is a drawing illustrating one embodiment of removing a connective stroke at a single connective point.

FIG. 3D is a drawing illustrating one alternate embodiment of removing a connective stroke at a single connective point 305. The written input 110 of FIG. 3C is shown with a connective stroke removed at the location of the single connective point 305. In the depicted embodiment, the connective stroke is removed at the single connective point 305 rather than between two connective points 305. In one embodiment, the connective point 305 and a specified number of adjacent points may be removed to remove the connective stroke.

Figure 3E:
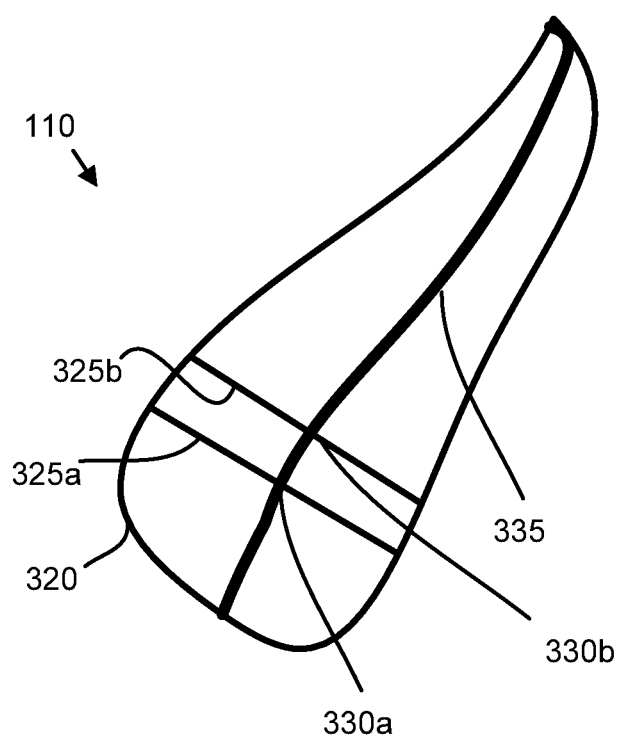
FIG. 3E is a drawing illustrating one embodiment of written input.

FIG. 3E is a drawing illustrating one embodiment of the written input 110. The written input 110 is depicted as an outline of a stroke 320. A stroke line 335 may be calculated for the written input 110. In addition, points 330 may be defined at regular intervals along the stroke line 335. For simplicity, only two points 330 are shown. Virtual width lines 325 may be generated for each point 330. The width lines 325 may be perpendicular to the stroke line 335.

Figure 4:
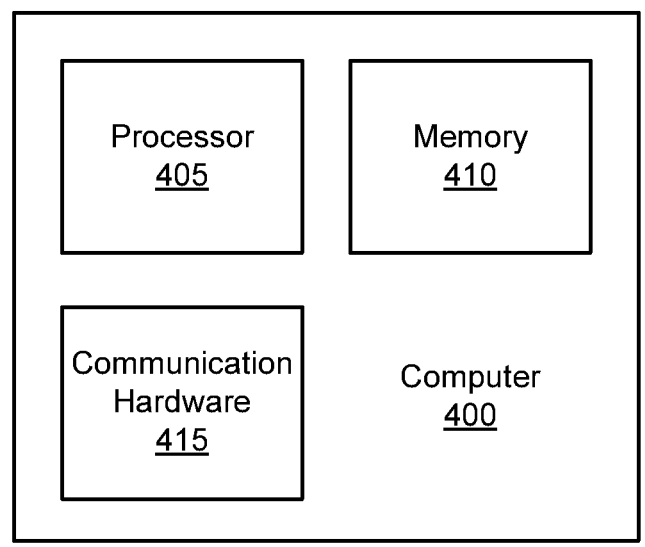
FIG. 4 is a schematic block diagram illustrating one embodiment of a computer.

FIG. 4 is a schematic block diagram illustrating one embodiment of a computer 400. The computer 400 may be embodied in the written input device 100. Alternatively, the computer 400 may be embodied in a server or computer workstation in communication with the written input device 100. In the depicted embodiment, the computer 400 includes a processor 405, a memory 410, and communication hardware 415. The memory 410 may comprise a semiconductor storage device, a hard disk drive, an optical storage device, a micromechanical storage device, or combinations thereof. The memory 410 may store code. The processor 405 may execute the code. The communication hardware 415 may communicate with other devices.

Figure 5:
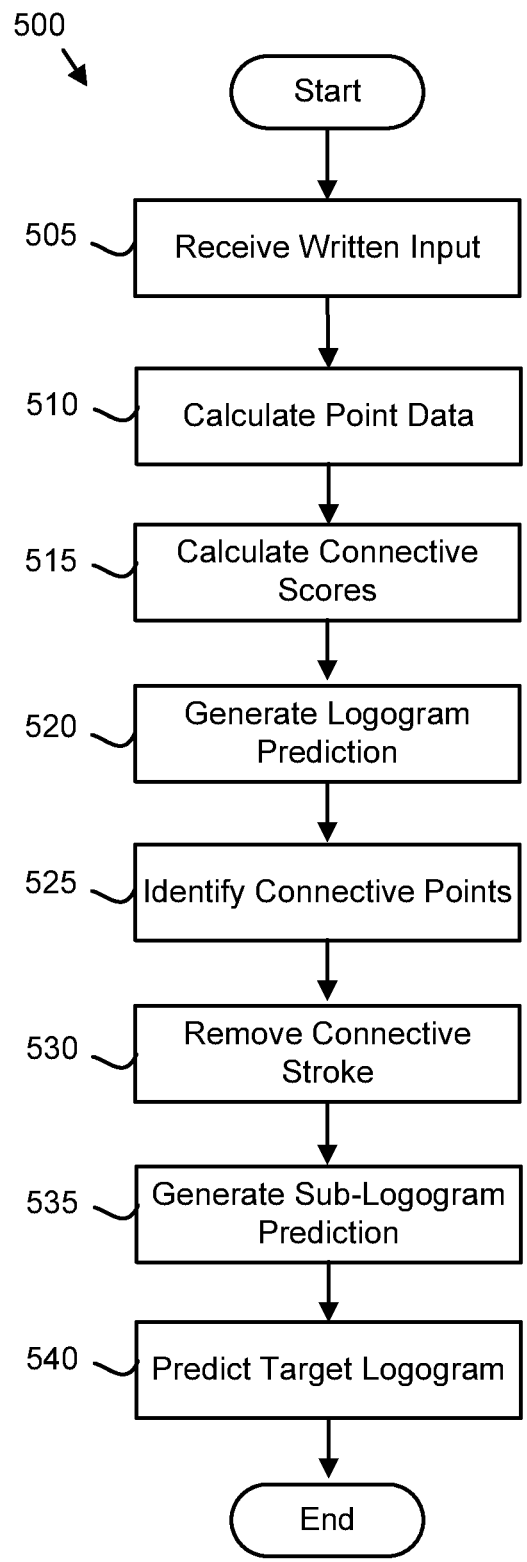
FIG. 5 is a schematic flow chart diagram illustrating one embodiment of a logogram prediction method.

FIG. 5 is a schematic flow chart diagram illustrating one embodiment of a logogram prediction method 500. The method 500 generates a logogram prediction from the written input 110 and a sub-logogram prediction for a sub-logogram formed by removing a connective stroke 310 from the written input 110. The method 500 further predicts a target logogram based on both the logogram prediction and the sub-logogram prediction. The method 500 may be performed by a processor 405. Alternatively, the method 500 may be performed by computer readable storage medium such as the memory 310. The computer readable storage medium may store code that is executed by the processor 305.

The method 500 starts, and in one embodiment, the code receives 505 the written input 110 from the written input device 100. The written input 110 may be a contiguous written input 110. A user may employ an input object to enter the written input 110 on the written input device 100.

The code may calculate 510 the point data 205 for the written input 110. In one embodiment, the code may generate a stroke line 335 through the written input 110 and store the stroke line 335 as stroke line data 207. The stroke line 335 may be a best fit approximation of the written input 110. The code may further define points 330 at regular intervals along the stroke line 335 and store the points 330 as the point data 205.

The code may calculate the X axis velocity 215 and the Y axis velocity 220 at each point 330. In one embodiment, the X axis velocity 215 and the Y axis velocity 220 are calculated as a function of a time interval of the input object traveling between points 330 on the stroke line 335.

The code may further calculate the stroke pressure 225 for each point 330. The stroke pressure 225 may be recorded from one or more strain gauges or the like.

The code may calculate a stroke width 230 for each point 330. In one embodiment, the code calculates a width line 325 for each point 330 and records a length of the width line 325 as the stroke width 230. The code may record the point coordinates 210, X axis velocity 215, Y axis velocity 220, stroke pressure 225, and stroke width 230 in the point data 205.

In one embodiment, the code calculates a stroke differential 235 for each point 330. The stroke differential 235 may be calculated as a difference in the stroke pressure 225 between a given point 330 and adjacent points 330 on the written input 110. Alternatively, the stroke differential 235 may be calculated as a difference in the stroke width 230 between the given point 330 and adjacent points 330 on the written input 110.

The code may calculate 515 the connective scores 240 for each point 330. The connective scores 240 may initially be set to zero. In addition, the connective score 240 for a given point 330 may be increased in response to the point 330 satisfying connective criteria. In one embodiment, the connective score 240 is calculated 515 as a function of one or more axes velocities at a given point 330. In addition, the connective score 240 may also be calculated 515 as a function of the stroke differential 235 at the given point 330.

In one embodiment, the connective score 240 may be increased in response to a first axis velocity that is less than a velocity threshold and the second axis velocity that is less than the velocity threshold. For example, the velocity threshold may be 0.2 millimeters/second. The first axis velocity may be the X axis velocity 215 and the second axis velocity may be the Y axis velocity 220. If both the X axis velocity 215 and the Y axis velocity 220 are less than the velocity threshold, the connective score 240 for the given point 330 may be increased.

Alternatively, the connective score 240 may be increased in response to a first axis velocity of zero and the second axis velocity of less than the velocity threshold. For example, the first axis velocity may be the Y axis velocity 220 and the second axis velocity may be the X axis velocity 215. If both the Y axis velocity 220 is zero and the X axis velocity 215 is less than the velocity threshold, the connective score 240 for the given point 330 may be increased.

In one embodiment, the connective score 240 is increased for maximal stroke differential 235. For example, if a given point 330 has a greatest stroke differential 235 relative to the one or more other points, the connective score 240 for the given point 330 may be increased. As a result, the connective score 240 for points 330 where a stroke 320 flares or narrows will have increased connective scores 240.

The code may generate 520 the logogram prediction 270 from the written input 110 and/or the written input data 200. In one embodiment, the code compares the written input 110 and/or the written input data 200 with the stroke data 265 for one or more logograms. The code may further generate 520 the logogram prediction 270 from the comparison.

The code may identify 525 one or more connective points 305 on the written input 110. Each connective point 305 may be identified 525 in response to the connective score 240 for the connective point 305 exceeding the connective threshold.

The code may further remove 530 a connective stroke 310 between two connective points 305 from the written input 110. The removal 530 of the connective stroke 310 between two connective points 305 is illustrated in FIG. 3B. In addition, the strokes 320 adjacent to the removed connective stroke 310 may be smoothed to eliminate angular edges.

In one embodiment, the two connective points 305 are selected such that removing 530 the connective stroke 310 forms one or more logogram elements 315 from the written input 110 preceding a first connective point 305a. Alternatively, the two connective points 305 are selected such that removing 530 the connective stroke 310 forms one or more logogram elements 315 from the written input 100 following the second connective point 305b.

The code may remove 530 a connective stroke 310 at a single connective point 305 as is illustrated in FIG. 3D. In one embodiment, a specified length of the stroke line 335 is removed 530. In addition, the strokes 320 adjacent to the removed connective stroke 310 may be smoothed to eliminate angular edges.

In one embodiment, the code generates 535 the sub-logogram prediction 275 for a sub-logogram formed by removing the connective stroke 310. The sub-logogram may be a logogram element 315. Alternatively, the sub-logogram may be one or more strokes 320 of a logogram. The sub-logogram prediction 275 may be generated 235 for the sub-logogram.

The code may compare the strokes 320 of the sub-logogram with the stroke data 265 for one or more logograms. The code may further identify a logogram and/or logogram element that best matches the strokes 320 of the sub-logogram. The identified logogram and/or logogram element may be the sub-logogram prediction 275.

In one embodiment, the written input 110 comprises two or more alphabetic letters and the sub-logogram is for a subset of the two or more alphabetic letters. The sub-logogram prediction 275 may be for the subset of the two or more alphabetic letters.

The code may predict 540 the target logogram 280 for the written input 110 based on both the logogram prediction 270 and the sub-logogram prediction 275 and the method 500 ends. The code may predict 540 a target logogram 280 as a function of the logogram prediction 270 and the sub-logogram prediction 275.

In one embodiment, the logogram prediction 270 and the sub-logogram prediction 275 are expressed as confidence levels. A combined confidence level may be calculated for one or more logograms as a Bayesian function of the logogram prediction 270 and the sub-logogram prediction 275. For example, the logogram prediction 270 may be a Bayesian prior probability P(A) and the sub-logogram prediction 275 may be a marginal likelihood P(B). The posterior probability of the target logogram 280 may be calculated using Equation 1, where P(B|A) is a probability of the sub-logogram prediction 275 given the logogram prediction 270.

$$P(A|B) = P(B|A)*P(A)/P(B) \quad \text{Equation 1}$$

In one embodiment, the code predicts 540 the target logogram 280 as a logogram identifier 260 for the logogram with the highest prior probability P(A|B).

The embodiments generate a logogram prediction 270. In addition, the embodiments identify and remove a connective stroke 310 and generate a sub-logogram prediction 275 for the sub-logogram formed by removing the connective stroke 310. The embodiments predict a target logogram 280 based on both the logogram prediction 270 and the sub-logogram prediction 275. As a result, the embodiments more accurately generate a target logogram 280.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a written input device;
   a processor;
   a memory that stores code executable by the processor, the code comprising:
   code that generates a logogram prediction from a contiguous written input from the written input device;
   code that removes a connective stroke between two connective points in the contiguous written input;
   code that generates a sub-logogram prediction for a sub-logogram formed by removing the connective stroke; and
   code that predicts a target logogram for the contiguous written input based on both the logogram prediction and the sub-logogram prediction.

2. The apparatus of claim 1, the code further comprising code that identifies each connective point in response to a connective score for the connective point exceeding a connective threshold.

3. The apparatus of claim 2, wherein the connective score is calculated as a function of one or more of axes velocities at the connective point and a stroke differential at the connective point.

4. The apparatus of claim 3, wherein the stroke differential is calculated as a difference in stroke pressure between the connective point and adjacent points on the contiguous written input.

5. The apparatus of claim 3, wherein the stroke differential is calculated as a difference in stroke width between the connective point and adjacent points on the contiguous written input.

6. The apparatus of claim 3, wherein the connective score is increased in response to a first axis velocity of less than a velocity threshold and a second axis velocity of less than the velocity threshold.

7. The apparatus of claim 3, wherein the connective score is increased in response to a first axis velocity of zero and a second axis velocity of less than a velocity threshold.

8. The apparatus of claim 3, wherein the connective score is increased for a maximal stroke differential.

9. The apparatus of claim 1, wherein removing the connective stroke forms one or more of a first logogram element from the contiguous written input proceeding a first connective point of the two connective points and a second logogram element from the contiguous written input following a second connective point of the two connective points.

10. The apparatus of claim 1, wherein the contiguous written input comprises two or more letters and the sub-logogram prediction is for a subset of the two of more letters.

11. A method comprising:
generating, by use of a processor, a logogram prediction from a contiguous written input;
removing a connective stroke between two connective points in the contiguous written input;
generating a sub-logogram prediction for a sub-logogram formed by removing the connective stroke; and
predicting a target logogram for the contiguous written input based on both the logogram prediction and the sub-logogram prediction.

12. The method of claim 11, the method further comprising identifying each connective point in response to a connective score for the connective point exceeding a connective threshold.

13. The method of claim 12, wherein the connective score is calculated as a function of one or more of axes velocities at the connective point and a stroke differential at the connective point.

14. The method of claim 13, wherein the stroke differential is calculated as a difference in stroke pressure between the connective point and adjacent points on the contiguous written input.

15. The method of claim 13, wherein the stroke differential is calculated as a difference in stroke width between the connective point and adjacent points on the contiguous written input.

16. The method of claim 13, wherein the connective score is increased in response to a first axis velocity of less than a velocity threshold and a second axis velocity of less than the velocity threshold.

17. The method of claim 13, wherein the connective score is increased in response to a first axis velocity of zero and a second axis velocity of less than a velocity threshold.

18. A program product comprising a computer readable storage medium that stores code executable by a processor, the executable code comprising code to perform:
generating a logogram prediction from a contiguous written input;
removing a connective stroke between two connective points in the contiguous written input;
generating a sub-logogram prediction for a sub-logogram formed by removing the connective stroke; and
predicting a target logogram for the contiguous written input based on both the logogram prediction and the sub-logogram prediction.

19. The program product of claim 18, the executable code further identifying each connective point in response to a connective score for the connective point exceeding a connective threshold.

20. The program product of claim 19, wherein the connective score is calculated as a function of one or more of axes velocities at the connective point and a stroke differential at the connective point.

* * * * *